Patented Oct. 31, 1950

2,527,602

UNITED STATES PATENT OFFICE 2,527,602

PROCESS OF SEPARATING CAROTENE FRACTIONS AND TOCOPHEROL-STEROL FRACTIONS FROM GREEN PLANT MATERIALS

Monroe E. Wall, Oreland, Pa., assignor to the United States of America as represented by the Secretary of Agriculture No Drawing. Application July 29, 1947, Serial No. 764,549

10 Claims. (Cl. 167—81)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the treatment of plant materials, particularly green leaves, and has among its objects the provision of methods of treating said plant materials to recover carotene, xanthophyll, tocopherol, and sterols as fractional concentrates of molecular distillation.

The preparation of carotene and xanthophyll from green leaves has been studied extensively. All the methods heretofore utilized involve extraction with solvents, such as hexane or acetone, followed by various saponification or adsorption treatments used singly or in combination. These procedures often require numerous steps and frequently result in the loss of many valuable constituents of the material treated. Practically no information on the recovery of tocopherols or sterols from green leaves appears to be available.

Saponification of leaf meal extracts sometimes causes partial destruction of the more unstable compounds present. On the other hand, distillation of the leaf meal extract without previous saponification does not yield satisfactory results due to persistent and violent foaming and splashing which occur during the distillation and also because some of the constituents of the leaf extract, being relatively insoluble in the oil carrier, tend to clog the pumping and distributing systems of the still.

I have found that the carotene, tocopherol, and sterols of green leaves can be separated into fractions rich in carotene and in tocopherol and sterols by mixing a solution of a low boiling organic solvent containing these constituents, with a high boiling oil, removing the low boiling organic solvent and then subjecting the resulting oil solution of the constituents to molecular distillation. Molecular distillation may be defined as a distillation process conducted at pressures of about from $1 \times 10^{-6}$ to $100 \times 10^{-6}$ centimeter of mercury and under such conditions that the distance between the evaporating and the condensing surfaces is relatively short. The procedures and equipment utilized in molecular distillation are described, for example, by Hickman Chemical Reviews, 34, 51 (1944). This method is limited to liquids of low vapor pressure and its industrial application has been restricted almost exclusively to the treatment of fish liver or vegetable oils. As a result of the molecular distillation of the oil solution, there are separated, as distillation fractions, a substantially carotene-free tocopherol-sterols fraction at a temperature of about from 120° to 180° C. and a fraction rich in carotene at a temperature exceeding about 180° C.

According to the invention two processes are provided for recovering the aforementioned constituents of green leaves.

The first, which will be called Process A, involves extracting leaf meal with a low boiling organic solvent such as hexane or acetone, saponifying the extract, for example, by the procedure described in Patent No. 2,394,278, removing the saponified material, mixing the remaining organic solvent solution of unsaponifiable material with a high boiling oil such as cottonseed, soybean, peanut, or similar vegetable oil, removing the organic solvent from this mixture, and then subjecting the resulting oil solution which contains the aforementioned constituents, to molecular distillation. As a result of this procedure carotene, xanthophyll, tocopherol, and sterol can be recovered as fraction concentrates in high yields.

The distillation can also be conducted in the presence of other high boiling oils, such as a mineral oil, although vegetable oils are preferred in the production of edible concentrates.

Phytol, which is a product of the saponification of chlorophyll, is also recovered as a fraction concentrate in high yield, it being obtained in the first distillate.

The second process, which will be called Process B, involves extracting the plant material, principally green leaves, with a low boiling organic solvent such as a hydrocarbon like pentane, hexane, heptane, or a chlorinated hydrocarbon like chloroform, or with ether or a similar organic fat solvent. The leaf extract is not saponified as in Process A, but instead, the unsaponified leaf extract is dissolved in a low boiling oxygen-containing organic solvent, such as a lower aliphatic ketone like acetone or methyl-ethyl ketone, or in a lower aliphatic alcohol like methyl, ethyl, or propyl alcohol. The resulting solution is maintained at a temperature not substantially in excess of room temperature (25° C.), or preferably cooled to about 4° to 5° C., for a length of time sufficient to cause separation of the insoluble components, as evidenced by the formation of a voluminous precipitate which is readily removed by filtration. The filtrate so obtained contains substantially all the carotene, xanthophyll, tocopherol, and sterols present in the original extract dissolved in the oxygen-containing organic solvent. The filtrate is then mixed with a high boiling oil, as in Process A, and the solvent is removed. The residual oil solution can then be fractionated by molecular distillation in a manner analogous to that used in the distillation of the unsaponifiable portion of leaf extract in Process A.

As will be observed, Process B does not utilize any saponification procedure and consequently no phytol is recovered. The carotene, xanthophyll, tocopherol, and sterols, however, are recovered in high yields. If phytol is required, the extraction of the leaf meal with the low boiling organic solvent, the solution of the resulting extract with the low boiling oxygen-containing organic solvent, followed by saponification and distillation in the usual manner is necessary.

The following examples are illustrative of the invention.

EXAMPLE I (PROCESS A)

Twenty-five pounds of leaf meals are extracted with 5 gallons of acetone, the solvent concentrated to about 2 gallons and the solution saponified with barium hydroxide, using the procedure described by Petering et al. Ind. & Eng. Chem. 32, 140, 1940. The saponification products are separated, and the remaining solution of unsaponifiables is mixed with cottonseed oil and all the solvent removed, preferably under conditions of mild heat and in vacuo. In most cases one-third to one-half pound of cottonseed oil is a suitable vehicle for the unsaponifiable products obtained from 20 to 25 pounds leaf meal.

The oil solution of unsaponifiables is now ready for molecular distillation. A cyclic molecular still is used and the oil is circulated in the still and kept at a temperature of 50° to 70° C. until it is degassed. Distillation is then started at a pressure of 5 to 20 microns ($5 \times 10^{-6}$ to $20 \times 10^{-6}$ cm. Hg). Fractions are taken at 100°, 120°, 140°, 160°, 180°, and 200° to 220° C. The 100° fraction is chiefly phytol (derived from chlorophyll) but may contain small quantities of tocopherol and sterols. The 120°, 140°, 160°, and 180° fractions contain as identifiable constituents tocopherol and sterols. The nature of the unidentified products is largely unknown—although vitamin K, if present, would be found in this distillation range. The highest concentrations of tocopherol and sterol are found in the 140° and 160° and 180° fractions. Depending on the source of leaf meal, tocopherol concentrations of 10 to 20 percent and sterol from 20 to 30 percent are secured.

The distillate at 200° to 220° C. contains 1 to 2 percent carotene largely in cottonseed oil which begins to distill at this temperature. The residual oil contains carotene, sterol, and tocopherol in low concentrations and along with considerable quantities of unidentified products.

Table I gives the details of a typical distillation of the unsaponifiables from 25 pounds rhubarb leaf meal (74 grams in 300 grams cottonseed oil).

*Table I*

| Product | Appearance | Weight, g. | Carotene | | Tocopherol | | Sterol | |
|---|---|---|---|---|---|---|---|---|
| | | | Per Cent | Total, g. | Per Cent | Total, g. | Per Cent | Total, g. |
| Oil soln. of unsaponifiables | Red oil | 374.0 | 0.38 | 1.4 | 1.6 | 1.6 | 1.9 | 7.0 |
| Distillate 100° C | Viscous yellow oil | 12.0 | 0.0 | 0.0 | 0.10 | 0.11 | 0.05 | 0.06 |
| Distillate 120° C | Semi solid yellow | 7.4 | 0.0 | 0.0 | 6.8 | 0.50 | 6.0 | 0.44 |
| Distillate 140° C | Orange solid | 5.8 | 0.0 | 0.0 | 22.4 | 1.30 | 25.0 | 1.50 |
| Distillate 160° C | do | 7.2 | 0.0 | 0.0 | 19.4 | 1.40 | 29.4 | 2.1 |
| Distillate 180° C | do | 7.0 | Trace | Trace | 16.0 | 1.10 | 18.0 | 1.26 |
| Distillate 200–220° C | Red oil | 40.0 | 1.0 | 0.40 | 1.0 | 0.40 | 1.2 | 0.48 |
| Residue | do | 278 | 0.13 | 0.35 | 0.2 | 0.56 | 0.2 | 0.56 |
| | | | | 0.75 | | 5.37 | | 6.40 |

From the above table it can be seen that in the most potent fractions carotene is concentrated about threefold, with a total recovery about 50 percent, tocopherol 10 to 12 fold with a total recovery close to 90 percent, sterol 10 to 15 fold with a total recovery about 90 percent. With centrifugal stills that are available, the carotene recovery can be raised to 90 percent or better.

Both the distilled and residual carotene fractions are free from odor and bland in taste in contrast to carotene concentrates prepared in the conventional manner. The distilled carotene can be used for edible purposes. Its concentration 1 to 2 percent approaches the maximum solubility of carotene in oil at room temperature. The residual oil contains 2000 to 3000 I. U. A per gram, the same concentration as commercial vitamin A fish liver oils used for poultry feeding oils. Both the distilled and residual oils contain xanthophyll with concentrations and recovery similar to that given for carotene.

EXAMPLE II (PROCESS B)

Twenty pounds of broccoli leaf meal were extracted with 5 gallons hexane. The hexane was concentrated to a volume of 1 quart under vacuo and mild heat. Two gallons of acetone were added with vigorous stirring and the solution allowed to stand at 4° C. overnight. The solution was filtered—a voluminous solid sludge was easily removed. The precipitate was not washed. The recovery of the desired constituents was almost quantitative.

The original hexane extract contained 385 grams solids. After the acetone precipitation, the filtrate contained 187 grams solids; so that approximately half the solids were removed by this treatment. The precipitate consisted largely of phospholipids and unknown products, and contained 30 percent unsaponifiable material.

The acetone filtrate was mixed with 1 pound cottonseed oil and the solvent evaporated. The residual oil solution was free flowing and contained no insoluble matter at room temperature.

The oil solution was then molecularly distilled as described previously in Example I. However, there was no distillate until a temperature of 120° C. was reached. Since saponification is eliminated, there is no phytol (a product of the saponification of chlorophyll). If phytol is required, an acetone extraction of the hexane extracted meal, followed by saponification and distillation in the usual manner is necessary.

Table 2 following gives the details of the distillation of the unsaponified broccoli extract.

Table II

| Product | Appearance | Weight, g. | Carotene | | Tocopherol | | Sterol | |
|---|---|---|---|---|---|---|---|---|
| | | | Per Cent | Total, g. | Per Cent | Total, g. | Per Cent | Total, g. |
| Oil soln. of leaf fats after acetone ppt. | Green oil | 657 | 0.55 | 3.4 | 0.57 | 3.7 | 1.45 | 9.5 |
| Distillate 120° | Yellow viscous oil | 3.6 | 0.0 | 0.0 | 3.1 | 0.11 | 6.7 | 0.24 |
| Distillate 140° | Orange solid | 9.2 | 0.0 | 0.0 | 9.3 | 0.86 | 26.9 | 2.48 |
| Distillate 160° | do | 9.7 | 0.0 | 0.0 | 12.5 | 1.22 | 30.2 | 2.92 |
| Distillate 180° | do | 11.3 | Trace | Trace | 9.0 | 0.90 | 20.0 | 2.25 |
| Distillate 200–220° | Red oil | 100.0 | 1.25 | 1.25 | 0.42 | 0.42 | 1.12 | 1.12 |
| Residue | Green oil | 500.00 | 0.18 | .90 | Trace | | Trace | |
| | | | | 2.15 | | 3.51 | | 9.01 |

From the data of Table II it can be seen that 60 percent of the carotene and over 90 percent of the tocopherol and sterols are recovered. In the most potent fractions carotene is concentrated twofold, tocopherol about 20 times and sterol 20 times. Therefore the concentration of the potent fractions is similar to that obtained with the saponification procedure.

A further purification of the tocopherol-sterol fractions is easily carried out by taking the material up in boiling ethanol and after cooling, filtering the precipitate which is largely sterols. One such treatment is sufficient to double the potency of tocopherol and sterol.

Having thus described my invention, I claim:

1. A process comprising mixing a solution of a low boiling organic solvent containing carotene, tocopherol, and sterols with a high boiling oil, removing the low boiling organic solvent from the resulting mixture, and subjecting the residual oil solution containing the carotene, tocopherol, and sterols to molecular distillation to separate, as distillation fractions, a substantially carotene-free tocopherol-sterols fraction at a temperature of about from 120° to 180° C. and a fraction rich in carotene at a temperature exceeding about 180° C.

2. A process of separating fractions rich in carotene and in tocopherol and sterols from green plant materials comprising extracting leaf meal containing carotene, tocopherol, and sterols with a low boiling organic solvent, saponifying the resulting extract, separating the sponified material from the unsaponifiable material, mixing the resulating low boiling organic solvent solution of the unsaponifiable material with a high boiling oil, removing the low-boiling organic solvent from the resulting mixture, and subjecting the residual oil solution containing the carotene, tocopherol, and sterols to molecular distillation to separate, as distillation fractions, a substantially carotene-free tocopherol-sterols fraction at a temperature of about from 120° to 180° C. and a fraction rich in carotene at a temperature exceeding about 180° C.

3. The process of claim 2 wherein the low boiling organic solvent is acetone.

4. The process of claim 2 wherein the high boiling oil is a vegetable oil.

5. The process of claim 2 wherein the high boiling oil is a mineral oil.

6. A process of separating fractions rich in carotene and in tocopherol and sterols from green plant materials comprising extracting leaf meal containing carotene, tocopherol and sterols with a low boiling organic fat solvent, dissolving the resulting extract in a low boiling oxygen-containing organic solvent selected from the group consisting of lower aliphatic ketones and lower aliphatic alcohols, maintaining the solution so formed at a temperature not substantially in excess of 25° C. for a length of time sufficient to cause the separating out of insoluble components, removing the insoluble components, mixing the residual solution with a high boiling oil, removing the low boiling organic solvents from the resulting mixture, and subjecting the residual oil solution containing the carotene, tocopherol, and sterols to molecular distillation to separate, as distillation fractions, a substantially carotene-free tocopherol-sterols fraction at a temperature of about from 120° to 180° C. and a fraction rich in carotene at a temperature exceeding about 180° C.

7. The process of claim 6 wherein the low boiling organic fat solvent is hexane.

8. The process of claim 6 wherein the temperature at which the solution of the extract and the low boiling oxygen-containing organic solvent is maintained until separation of insoluble components occurs, is about from 4° C. to 5° C.

9. The process of claim 6 wherein the low boiling oxygen-containing organic solvent is a lower aliphatic ketone.

10. The process of claim 6 wherein the low boiling oxygen-containing organic solvent is acetone.

MONROE E. WALL.

REFERENCES CITED

The following references are of record in the file of this patent:

UNITED STATES PATENTS

| Number | Name | Date |
|---|---|---|
| 2,098,254 | Mattill | Nov. 9, 1937 |
| 2,131,394 | Test | Sept. 27, 1938 |
| 2,146,894 | Hickman | Feb. 14, 1939 |
| 2,150,684 | Hickman | Mar. 14, 1939 |
| 2,180,356 | Hickman | Nov. 21, 1939 |
| 2,207,385 | Smith | July 9, 1940 |
| 2,256,392 | Hickman | Sept. 16, 1941 |
| 2,327,766 | Cawley | Aug. 24, 1943 |
| 2,383,561 | Petering | Aug. 28, 1945 |
| 2,394,278 | Wall | Feb. 5, 1946 |
| 2,432,181 | Trent | Dec. 9, 1947 |

(References on following page)

UNITED STATES PATENTS

| Number | Name | Date |
|---|---|---|
| 2,482,635 | Petering | Sept. 20, 1949 |

FOREIGN PATENTS

| Number | Country | Date |
|---|---|---|
| 565,095 | Great Britain | Oct. 24, 1944 |

OTHER REFERENCES

Wall, Industrial and Engineering Chemistry, vol. 36, Nov. 1944, pages 1057 to 1061.

Almquist, Journal of Biological Chemistry, vol. 120, Sept. 1937, pages 635 to 640.